UNITED STATES PATENT OFFICE.

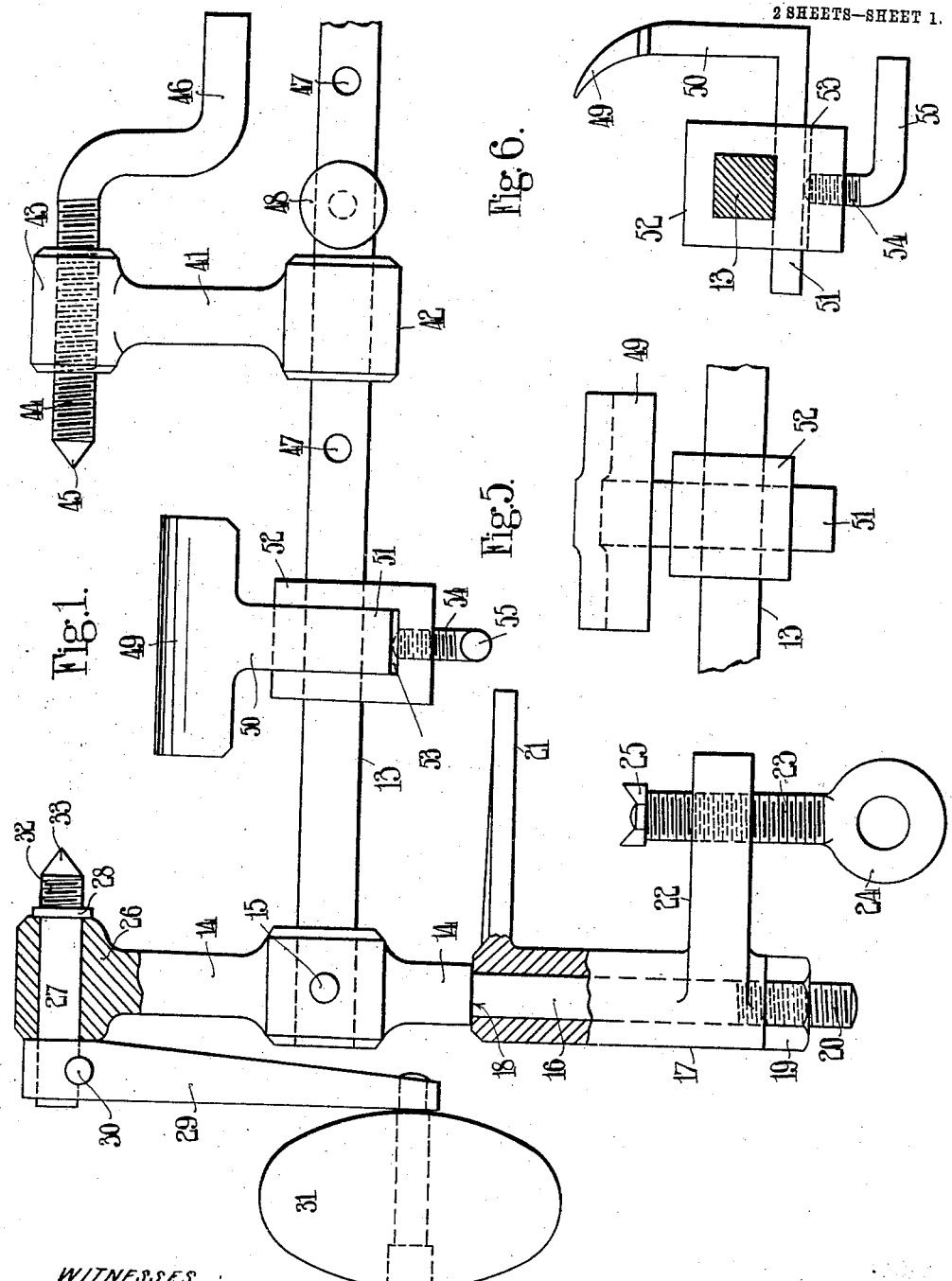

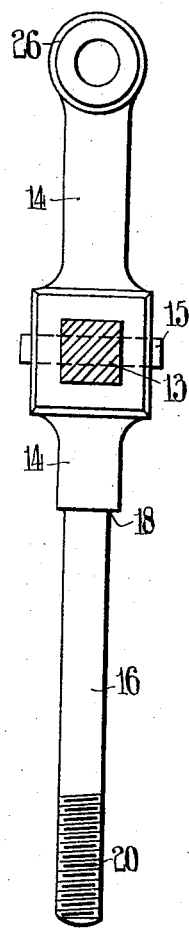

WILLIAM DENHAM VERSCHOYLE, OF TANRAGO, BALLISODARE, IRELAND.

PORTABLE TURNING-LATHE.

No. 918,227.   Specification of Letters Patent.   Patented April 13, 1909.

Application filed September 1, 1908.   Serial No. 451,258.

*To all whom it may concern:*

Be it known that I, WILLIAM DENHAM VERSCHOYLE, a subject of the King of Great Britain, and resident of Tanrago, Ballisodare, in the county of Sligo, Ireland, mining engineer, have invented an Improved Portable Turning-Lathe, of which the following is a specification.

This invention relates to a portable turning lathe suitable for use in executing woodwork of small dimensions, the principal object of the invention being to provide a very simple and handy machine tool of the kind referred to, which will be little heavier and will occupy little more room than an ordinary drilling brace and which, when required for use, can be assembled and clamped to an ordinary table or other convenient support, or can in various situations be employed instead of a brace for boring holes with accuracy and despatch, while the various parts can be quickly taken asunder and carried in an ordinary tool basket.

The bed of the lathe of this invention is constituted by a bar of rectangular or equivalent cross section, fixed at one end to an upright member forming both the headstock of the lathe and a means of attaching the lathe to the clamp whereby it may be fixed to an extraneous support. For this purpose the upright member crosses the bed-bar at right angles, its lower portion being cylindrical and adapted to fit in and pass through a socket provided in the clamp, relatively to which the bed-bar can therefore be swung into any desired angular position and therein secured by means of a nut working on the threaded lower extremity of the upright member and bearing against the bottom of the socket.

The upper portion of the upright member has a bearing which extends parallel with the bed-bar and receives the driving spindle of the lathe, this spindle being provided at its outer end with a crank handle whereby it may be rotated, and at its coned inner end with means for the attachment of a chuck or face-plate or other device as required.

The puppet-head of the lathe consists of an upright post whose lower end is apertured to fit and slide on the bed-bar, lengthwise of which it may be adjusted and held by means of a dowel-pin passing through any one of a series of holes in the bar. The upper end of the puppet-head has a threaded aperture 55 which extends parallel to the bed-bar and receives a screw-spindle which carries the back-center of the lathe, the outer end of this spindle being preferably cranked to enable it to be turned so as to effect the final adjustment of the distance between the lathe-centers.

The tool-rest is carried by a block apertured to slide upon the bed-bar, and is of special construction whereby it is rendered readily adjustable as regards position both lengthwise of the bed and radially with reference to the axis of the lathe.

In the accompanying drawings Figure 1 is a front elevation of the lathe of the present invention, parts being in section. Fig. 2 is a face view of the upright member at the headstock end of the lathe. Fig. 3 is a plan view of the clamp. Fig. 4 is a face view of the puppet-head. Figs. 5 and 6 are respectively a plan and an end view of the tool-rest. Fig. 7 shows, separately, the dowel-pin for determining the position of the puppet-head. Figs. 8 and 9 are respectively side and face views of a face plate. Fig. 10 shows a carrier. Figs. 11 and 12 are side and end views of a chuck.

Similar numerals of reference denote like parts throughout the drawings.

The entire apparatus may be formed of metal.

The lathe bed is constituted by a bar 13 of square cross section which extends parallel to the axis of the lathe, the headstock end of the bar fitting in a hole in an upright 14, wherein it may be secured by a cross-pin as at 15 so that the bar 13 and upright 14 together form a T-shaped figure.

The lower portion 16 of the upright 14 is cylindrical and fits in a corresponding socket 17 provided in a table-clamp, a shoulder 18 on the upright resting on the top of the socket and being drawn down tightly thereon by means of a nut 19 which works on a screw thread 20 at the lower extremity of the upright. The clamp comprises two arms 21, 22 integral with and projecting from the socket 17 parallel to the axis of the lathe, the lower arm 22 having a threaded hole through which works a clamping thumb-screw 23 parallel to the axis of the upright member 16. The screw 23 has a head 24 at its lower end, its upper end carrying a rotatable gripping dog 25 between which and the upper arm 21 may be clamped the margin of a table-top or other convenient support.

It will be seen that after the clamp has been fixed to such support, the bed-bar 13 can be swung around to any desired angular position about the axis of the socket 17, and finally secured therein by screwing up the nut 19.

The upper end of the upright 14 has a bearing 26 for the reception of the driving spindle 27 of the lathe, this bearing extending of course parallel to the bed-bar 13. The spindle 27 has a shoulder 28 adapted to engage against the inner end of the bearing 26 for the purpose of taking the thrust transmitted from the puppet-head center, the outer end of the spindle projecting beyond the bearing and being adapted to receive a crank-arm 29 which may be keyed to the spindle by a cross-pin 30 and which is provided with a rotatable handle 31.

The inner end of the spindle 27, beyond the shoulder 28, is screw-threaded as at 32, and terminates in the usual coned pivot-center 33. When the apparatus is used as a turning lathe, there is screwed on to the threaded portion 32 of the spindle a circular face-plate 34 having a hole or holes as at 35 (Fig. 9) for the reception of a removable driving pin 36 which is caused to engage a carrier 37 (Fig. 10) in the form of a screw-clamp fixed to the work when the latter is mounted between the centers of the lathe as usual. For some operations, the face-plate 34 may be replaced by an internally screw-threaded socket 38 which is of sufficient length to project well beyond the point of the pivot-center 33, and which is adapted to carry a chuck 39 having a square central aperture for the reception of any ordinary boring bit whereby the boring of holes may be effected.

The puppet-head comprises an upright post 41 having at its lower end an apertured socket 42 (Fig. 4) which fits upon the bed-bar 13, and at its upper end a bearing 43 internally screw-threaded to receive a screw-spindle 44 which extends in axial alinement with the driving spindle 27. The inner end of the spindle 44 constitutes the back-center of the lathe, for which purpose it terminates in the usual coned pivot 45, while the outer end is bent into or provided with a crank-handle 46 for rotating the spindle so as to advance or retract the center 45 as may be required. The preliminary coarse adjustment of this center is effected by sliding the puppet-head along the bed-bar 13, which is provided with a series of transverse holes 47 each adapted to receive a dowel-pin 48 constituting an abutment against which the outer end of the socket 42 is caused to bear by the thrust transmitted from the screw-spindle 44.

The tool-rest comprises the tool-rest proper, which consists of a straight bar 49 of the usual curved form in cross section, extending parallel to the axis of the lathe. The rest 49, which is mounted as usual in front of the lathe-axis, is carried by a rectangular bar 50 which extends first downward, and then horizontally rearward beneath said axis as at 51 so as to be adapted to slide through a rectangular aperture 53 in a carrier-block 52 which has another aperture whereby it is adapted to slide upon the bed-bar 13. The aperture 53 intersects the aperture through which the bed-bar 13 passes, so that the bar 50 will contact with the lower surface of said bed-bar. When the tool-rest 49 has been adjusted at any required distance from the surface of the work by sliding the bar 51 through the block 52, it may be clamped in position by means of a clamping screw 54 (having a handle 55) working through a threaded hole provided in the bottom of the carrier-block 52 and serving simultaneously to force the bar 51 upward, and to draw the block 52 downward, both against the bed-bar 13. Hence, by means of the clamping screw 54 both the position of the tool rest 49 relatively to the carrier-block 52 and also that of the carrier-block relatively to the bed-bar 13, are fixed.

The mode of using the apparatus as a turning lathe need not be described. For boring holes for example in posts, rails etc., the chuck 39 is mounted in position and fitted with a suitable boring bit, the point of which is entered at the proper spot in the work while the screw 44 is advanced so as to cause the center 45 to bite into the work at a point exactly opposite to the center of the bit. As the handle 31 is rotated, the screw 44 is further advanced until the limit of depth attainable with the boring bit employed is reached. The open mouth of the hole thus produced may then be temporarily plugged, and the operation repeated from the opposite side of the work, which will usually suffice for holes of any ordinary depth or length.

Claims—

1. A portable turning lathe whereof the bed is constituted by a bar attached to an upright whose lower portion is fitted to turn in and adapted to be fixed relatively to a socket forming part of a clamp whereby the entire lathe may be secured to a table or other extraneous support, the upper portion of said upright being provided with a bearing for the reception of the driving spindle of the lathe, which is furnished with a crank-handle whereby it may be rotated, substantially as described.

2. The combination with a turning lathe of the kind referred to, of a tool-rest comprising a carrier-block fitted to slide lengthwise of the bed-bar, a rest mounted upon said block and adjustable independently thereof toward
5 and from the axis of the spindle, and a clamping screw adapted to fix both the position of said rest relatively to the carrier-block and also that of the carrier-block relatively to the bed-bar, substantially as set forth.

WILLIAM DENHAM VERSCHOYLE.

Witnesses:
ARTHUR JACKSON,
JAMES OSBORNE.